Patented Jan. 4, 1927.

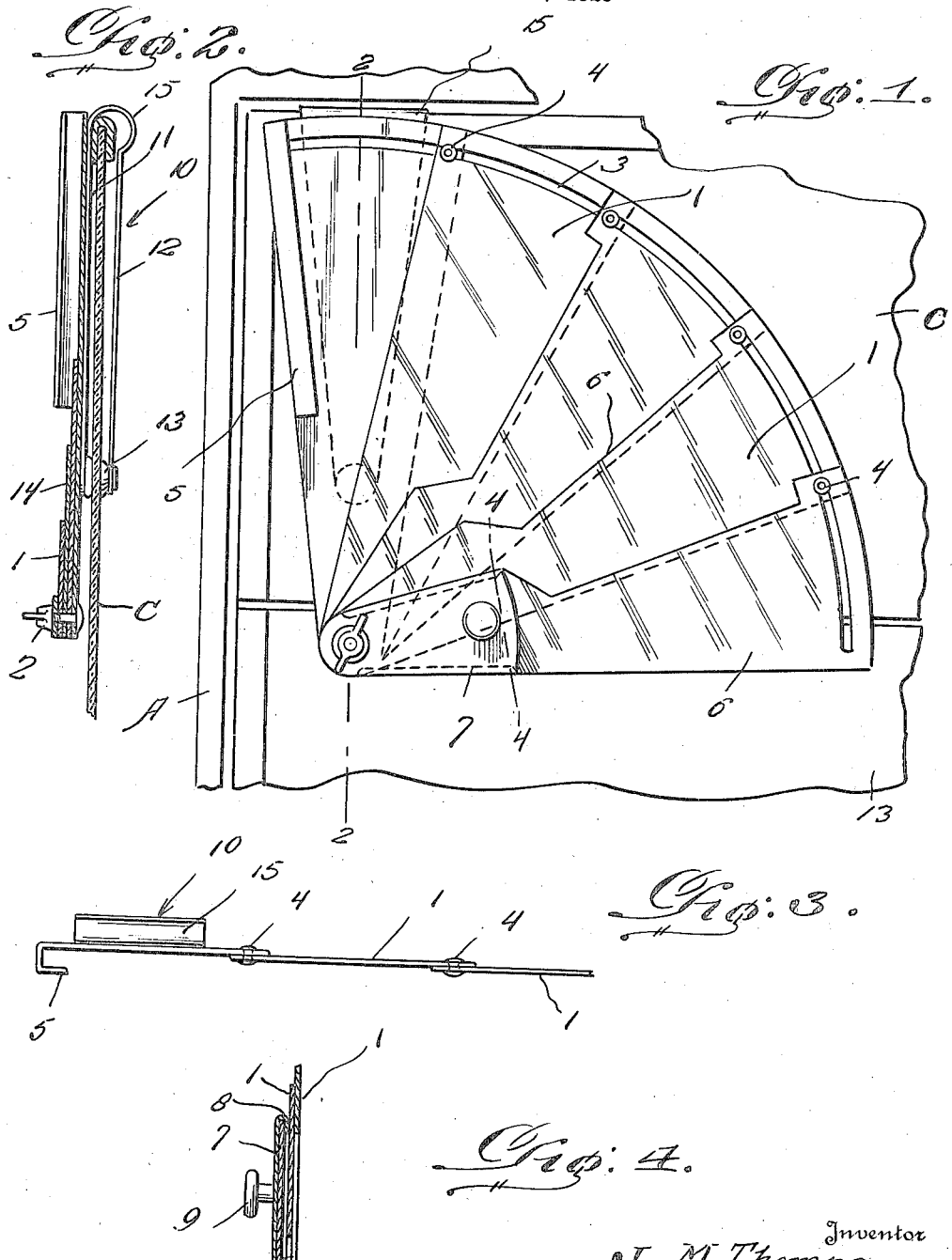

1,613,364

UNITED STATES PATENT OFFICE.

JOHN M. THOMPSON, OF EDGEWOOD, IOWA.

GLARESHIELD.

Application filed February 25, 1925. Serial No. 11,506.

This invention relates to an improved glare shield of the type used upon automobile windshields for the purpose of intercepting light rays from the headlights of approaching vehicles, whereby to subdue the rays sufficiently to overcome the blinding effect usually experienced.

The primary object is to generally improve upon devices of this class by providing one of comparative simplicity, and durability, which is capable of being mounted on various makes of automobiles and which is composed of a plurality of foldable sections which can be readily folded to dispose the device out of the line of vision of the operator.

One feature of the invention is the novel attaching clamp provided permitting the device to be securely fastened upon the windshield.

Another feature is the novel foldable fan-like structure, the sections of which are colored to serve for effectively intercepting light rays.

Other features and advantages of the invention will become apparent from the following description and drawings.

In the accompanying drawing:—

Figure 1 is a front elevation of a glare shield constructed in accordance with this invention showing the same attached to the upper half of an automobile windshield of a conventional form.

Figure 2 is a detail section taken approximately from the plane of the line 2—2 of Figure 1.

Figure 3 is a top plan view of a portion of the device in its expanded condition.

Figure 4 is a detail section taken approximately on the plane of the line 4—4 of Figure 1.

In the drawing, the reference character A may designate an automobile windshield frame, the letter B the lower windshield section and the letter C the upper windshield section. It is to the upper section of the windshield that the device is shown applied. It is to be understood however that inasmuch as windshield constructions vary considerably under various makes of automobiles, the improved device may have to be modified somewhat to permit effective application on a different kind of windshield.

As before stated, the device is in the form of a fan-like structure. It is preferably composed of a plurality of substantially duplicate sections 1. These are of segmental form and are composed of comparatively rigid celluloid of a green color. A bolt passes through the lower ends of the sections 1 and a thumb nut 2 is threaded thereon to bind the sections together and maintain them in assembled relation. The upper end of each section is formed with an elongated slot 3, in which a stop 4 carried by the adjacent coacting sections is slidable, the slot being of arcuate formation and permitting the sections to be expanded into the overlapping relation shown in Figure 1. This arrangement also permits the sections to be folded into a very compact device. The outermost section is provided on its outer vertical edge with a channel 5 into which the other sections are folded into overlapping relation when the device is not in use. Attention is directed to the fact that the intermediate portions of the overlapping edges of the sections are notched as indicated at 6 so that only a very small portion of the coacting sections overlap each other. This is done to make for greater transparency. The lower or outermost section referred to additionally by the character 6 is provided at its lower small end with a plate 7, the edges of which are bent around its edges as indicated at 8 in Figure 4. This plate constitutes a carrier for a finger knob 9 employed to facilitate opening and closing of the device.

While other means may be provided for attaching the device to a windshield, I prefer to employ the attaching means more clearly shown in Figure 2. Reference being had to this figure it will be seen that a substantially U-shaped attaching clip or clamp 10 is provided, the same having one arm 11 thereof fastened to the outer face of the relatively stationary outer section of the shield and the other arm 12 thereof extending upon the outer side of the windshield section. The arm 12 is provided at its lower end with a vacuum cup 13 and if desired, an appropriate spacer 14 may be interposed between the inner face of the windshield and the arm 11. The bight portion 15 of this clamp is sufficiently large to accommodate the upper part of the rim of the windshield.

In practice the clamp 10 is placed upon the windshield so that the arms thereof straddle the same. Normally, the segmental celluloid sections of the shield are folded into overlapping relation in the channel 5 and the thumb screw 2 is tightened to hold them in this manner. To dispose the device in an operative position, the thumb screw is simply loosened and the sections are allowed to drop into the relative positions shown in Figure 1, thus presenting a transparent shield in the line of vision of the operator's eyes. Consequently, the otherwise blinding rays from the headlights of approaching machines are intercepted by the shields, and the operator's eyes protected and safe driving assured. When the device is not in use the hand knob 7 is grasped and the several sections are lifted upwardly in succession under the action of the pin and slot connections at the top.

It is thought that the foregoing description taken in connection with the accompanying drawings will enable persons skilled in the art to which the invention relates to obtain a clear understanding of the same. Therefore a more lengthy description is thought unnecessary.

Although the preferred embodiment of the invention has been shown and described, it is to be understood that various changes in the size, shape and arrangement of parts may be resorted to without departing from the spirit of the invention and scope of the appended claims.

Having thus described the invention, what I claim as new is:—

1. A glare shield of the kind specified comprising a plurality of pivotally connected segmental sections of transparent material, a pivotal connection for securing said sections together at one end, pin and slot connections between the opposite ends of said sections, the adjacent edges of said sections being disposed in overlapping relation when the sections are in operative position, the overlapping edges of certain of said sections being provided with notches to expose the greatest area possible of the underlying and cooperating section, and a handle carried by one of said sections.

2. A glare shield of the class described comprising a plurality of segmental transparent blades pivotally secured together at one end, said blades being arranged in overlapping relation, the outer free end portions of the blades being provided with arcuate slots, pins operable in said slots for limiting the outward swinging movement of the blades with respect to each other, the adjacent edges of the blades being disposed in overlapping relation when the segmental blades are in operative position, the overlapping edges of certain of said blades having their intermediate portions cut out to expose the greatest area possible of the underlying and cooperating blades, the outer edge of one of the endmost blades having a channel associated therewith for the reception of the remaining blades when the latter are arranged in an inoperative position, a relatively small plate having its side edges bent over the side edges of the pivoted end of the other endmost blade, and a handle carried by said plate to facilitate the actuation of said pivoted blade.

In testimony whereof I affix my signature.

JOHN M. THOMPSON.